(12) United States Patent
Ise et al.

(10) Patent No.: US 8,880,921 B2
(45) Date of Patent: Nov. 4, 2014

(54) COMMUNICATION DEVICE AND COMMUNICATION SYSTEM

(75) Inventors: Kotaro Ise, Kanagawa (JP); Yoshimichi Tanizawa, Kanagawa (JP); Takeshi Ishihara, Kanagawa (JP); Masataka Goto, Kanagawa (JP); Eiji Kamagata, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 517 days.

(21) Appl. No.: 13/053,449

(22) Filed: Mar. 22, 2011

(65) Prior Publication Data

US 2012/0079302 A1  Mar. 29, 2012

(30) Foreign Application Priority Data

Sep. 24, 2010  (JP) ................. 2010-213561

(51) Int. Cl.
*G06F 1/26* (2006.01)
*G06F 1/32* (2006.01)

(52) U.S. Cl.
USPC ........................................ 713/323

(58) Field of Classification Search
CPC ... G06F 12/1433; G06F 1/3209; G06F 1/324; G06F 1/3296; G06F 21/33; G06F 21/606; H04L 63/0823; H04L 63/0876
USPC .................. 713/300, 320, 323; 340/5.8, 10.4; 455/39
See application file for complete search history.

(56) References Cited

U.S. PATENT DOCUMENTS

2009/0181713 A1* 7/2009 Lee et al. ................ 455/522
2011/0102157 A1* 5/2011 Tarkoma ................. 340/10.33

FOREIGN PATENT DOCUMENTS

| JP | 11-088352 | 3/1999 |
|---|---|---|
| JP | 2000-115222 | 4/2000 |
| JP | 2001-257735 | 9/2001 |
| JP | 2001320415 | 11/2001 |
| JP | 2002016612 | 1/2002 |
| JP | 2002-2218099 | 8/2002 |
| JP | 2003-089254 | 3/2003 |
| JP | 2003248525 | 9/2003 |
| JP | 2006-277332 | 10/2006 |
| JP | 2007-214731 | 8/2007 |
| JP | 2007-259339 | 10/2007 |
| JP | 2008141290 | 6/2008 |
| JP | 2008-263294 | 10/2008 |
| JP | 2009-253748 | 10/2009 |
| JP | 2010-166412 | 7/2010 |
| JP | 2010-193126 | 9/2010 |

OTHER PUBLICATIONS

Japanese Office Action for Japanese Application No. 2010-213561 mailed on Aug. 14, 2012.
Japanese Office Action for Japanese Application No. 2010-213561 mailed on Dec. 4, 2012.
Chinese Office Action for Chinese Patent Application No. 201110240121.X mailed on Oct. 22, 2013.

* cited by examiner

*Primary Examiner* — Michael J Brown
(74) *Attorney, Agent, or Firm* — Amin, Turocy & Watson, LLP (57) ABSTRACT

According to an embodiment, a communication device includes a wake-up signal reception unit configured to receive a wake-up signal to request a change of a state from a second state to a first state, the second state requiring less power consumption than the first state; and a state control unit configured to change the state from the second state to the first state and inform a control unit of the change of the state when the wake-up signal is received, the control unit being configured to process a frame received during the first state.

9 Claims, 12 Drawing Sheets

| D0 | D1 | D2 | D3 | D4 | D5 | D6 | D7 | D8 | D9 | D10 | D11 | D12 | D13 | D14 | D15 |
|----|----|----|----|----|----|----|----|----|----|-----|-----|-----|-----|-----|-----|
| S0 | S0 | S2 | S3 | S4 | A0 | A1 | A2 | A3 | A4 | A5  | A6  | A7  | RF  | Ack | NP  |

|←  SELECTOR FIELD  →|←  TECHNOLOGY ABILITY FIELD  →|OTHER FIELD|

802.3=00001
802.9=00010

A0 10BASE-T
A1 10BASE-T FULL DUPLEX
A2 100BASE-TX
A3 100BASE-TX FULL DUPLEX
A4 100BASE-T4
A5 FLOW CONTROL PAUSE MANIPULATION
A6 RESERVED
A7 RESERVED

RF REMOTE FAULT
Ack ACKNOWLEDGE
NP NEXT PAGE

COMMUNICATION DEVICE AND COMMUNICATION SYSTEM

CROSS-REFERENCE TO RELATED APPLICATIONS

This application is based upon and claims the benefit of priority from Japanese Patent Application No. 2010-213561, filed on Sep. 24, 2010; the entire contents of which are incorporated herein by reference.

FIELD

Embodiments described herein relate generally to a communication device and a communication system.

BACKGROUND

Various terminals such as PCs (Personal Computers) have employed, for example, Ethernet (trade mark) for communications. These terminals need to be held in an active state all the time because it is unknown when a communication frame will arrive. Meanwhile, a recent increasingly growing trend to reduce power consumption has led to a number of attempts to reduce power consumption on those terminals. For example, there has arisen a technique which allows for selecting between an active state in which power is supplied to the entire terminal and a low-power state in which power is supplied only to a section of the terminal responsible for communications to monitor a frame for transition to an active-state.

However, such a technique as mentioned above cannot reduce power consumption in the section responsible for communications because power is still supplied to that section.

DETAILED DESCRIPTION

According to an embodiment, a communication device includes a wake-up signal reception unit configured to receive a wake-up signal to request a change of a state from a second state to a first state, the second state requiring less power consumption than the first state; and a state control unit configured to change the state from the second state to the first state and inform a control unit of the change of the state when the wake-up signal is received, the control unit being configured to process a frame received during the first state.

Various embodiments will be described hereinafter with reference to the accompanying drawings.

First Embodiment

Figure 1:
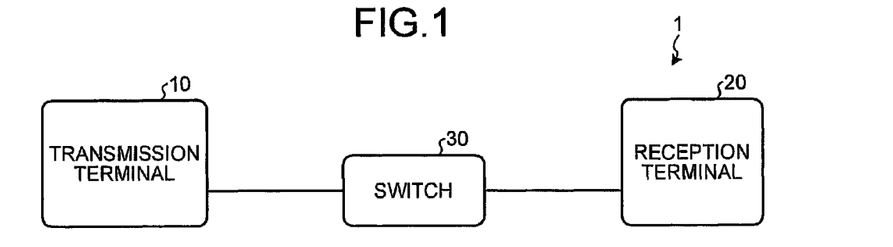
FIG. 1 is a block diagram illustrating an example of the configuration of a communication system according to a first embodiment.

FIG. 1 is a block diagram illustrating an exemplary layout of a communication system 1 according to a first embodiment. As shown in FIG. 1, the communication system 1 includes a transmission terminal 10, a reception terminal 20, and a switch 30. The transmission terminal 10 and the reception terminal 20 are connected to each other via the switch 30. In the first embodiment, the communication system 1 employs the Ethernet (trade mark) communication scheme and has a communication speed of 10 Mbps. However, the embodiment is not limited to this example. Furthermore, the transmission terminal 10 and the reception terminal 20 can be used for both transmission and reception. But, for simplicity of explanation, the descriptions below will be made assuming that the transmission terminal 10 is dedicated only to sending of wake-up signals and frames and the reception terminal 20 is dedicated only to receiving of wake-up signals and frames. However, the embodiment is not limited to this example.

Hereafter, the terms, "the transmission node" and "the reception node" will also be used. Here, the transmission node refers to a transmitter of wake-up signals and frames, for example, the transmission terminal 10 and the switch 30 which sends wake-up signals and frames to the reception terminal 20. Likewise, the reception node refers to a receiver of wake-up signals and frames, for example, the reception terminal 20 and the switch 30 which receives wake-up signals and frames from the transmission terminal 10.

Furthermore, the transmission node and the reception node of the communication system 1 have a communication unit, i.e., NIC (Network Interface Card). The NIC has two states: an active state (an example of a first state, hereafter referred to as "N1") in which frames can be sent and received, and an LPI (Low Power Idle) state (an example of a second state, hereafter referred to as "N2") in which frames cannot be sent and the clock frequency is lower than in the active state. In the communication system 1, the transmission node and the reception node exchange NLPs (Normal Link Pulses), thereby knowing that they are linked to each other and send or receive frames via the link. When the communication units of the transmission node and the reception node are in N1, the nodes exchange NLPs periodically. However, when the communication units of the transmission node and the reception node are in N2, no NLPs are exchanged. When the communication unit of the reception node is returned from N2 to N1, NLPs are exchanged. This operation serves to further reduce power consumption in the transmission node and the reception node when no frames are transmitted.

Figure 2:
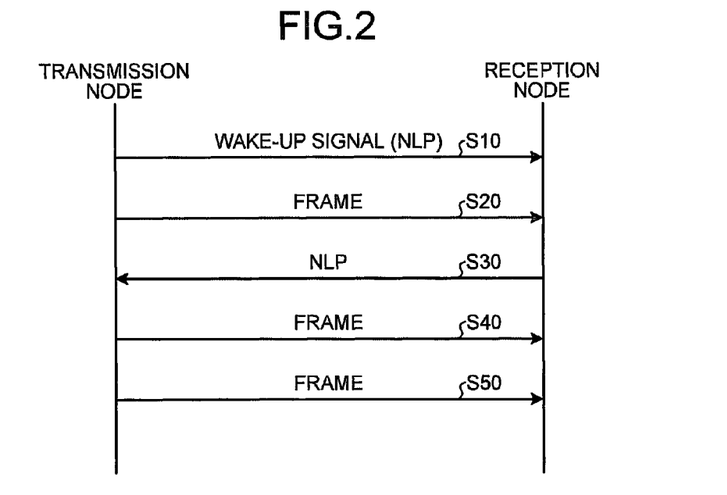
FIG. 2 is a sequence diagram illustrating an example of data transmission and reception between nodes in the communication system according to the first embodiment.

FIG. 2 is a sequence diagram showing an example of the flow of data transmission and reception between nodes in the communication system 1 according to the first embodiment.

Figure 3:
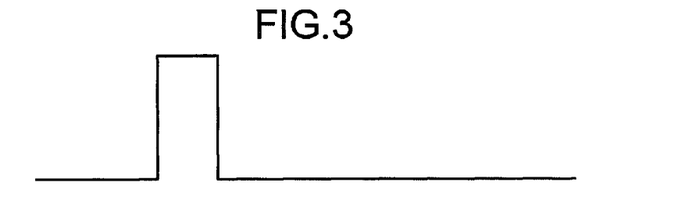
FIG. 3 is a view illustrating an example of an NLP to be sent as a wake-up signal according to the first embodiment.

When sending a frame, the transmission node first sends an NLP as a wake-up signal to, the reception node (step S10). FIG. 3 is a view illustrating an example of an NLP to be sent as a wake-up signal. Here, when having received a wake-up signal (NLP) in N2, the communication unit of the reception node increases the clock frequency, thereby transitioning to N1 to prepare for receiving frames. At this time, the communication unit of the reception node also desirably increases the supply voltage.

Figure 4:
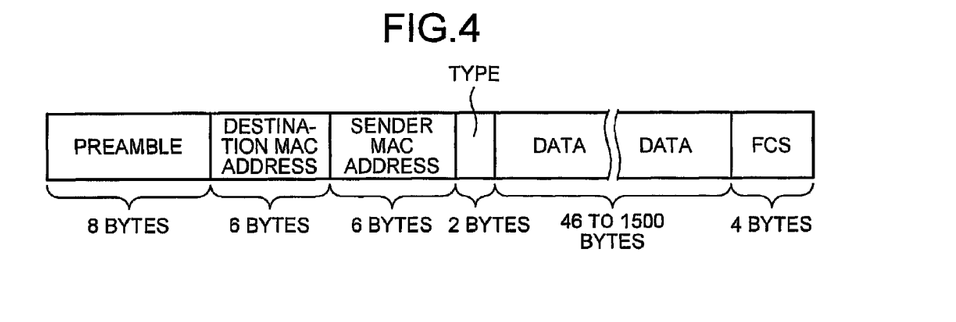
FIG. 4 is a view illustrating an example format of a frame according to the first embodiment.
Figure 5:
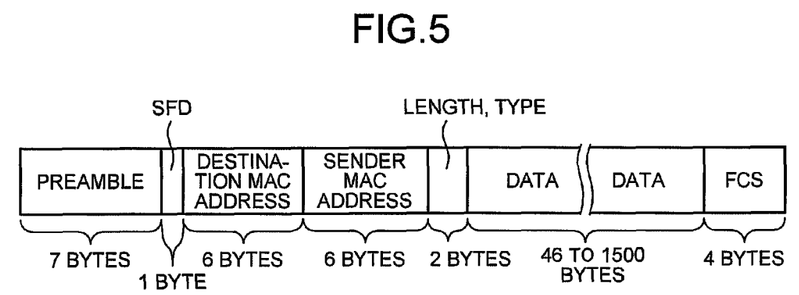
FIG. 5 is a view illustrating an example format of a frame according to the first embodiment.

Subsequently, the transmission node transmits the frame of interest to the reception node (step S20). FIGS. 4 and 5 are views illustrating an exemplary frame format. The transmission node may transmit frames having any one of the frames of FIGS. 4 and 5. Here, since the frame is transmitted in the form of electrical signals, the communication unit of the reception node needs to perform digital signal processing for correcting for disturbances in signals in order to receive the frame successfully. Accordingly, as the digital signal processing, the communication unit of the reception node makes use of a known bit pattern, referred to as the preamble, which is given to the head of the frame. The bit pattern is used to calculate a filter coefficient (waveform fluctuation component) for compensating for transmission distortions or to adjust the reception side PLL for bit synchronization with the transmission node. Hereinafter, the processing for determining these parameters will be referred to as the "warm-up."

Figure 6:
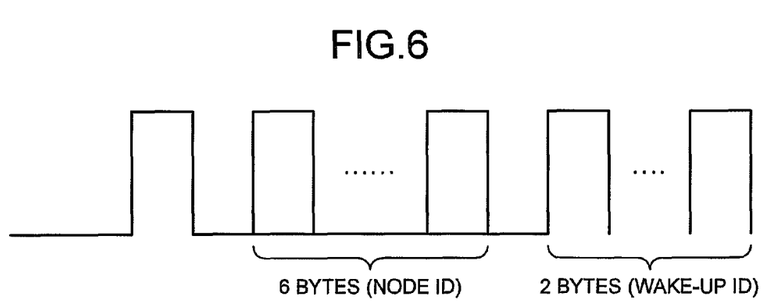
FIG. 6 is a view illustrating an example of an NLP to be sent as a response signal according to the first embodiment.

Subsequently, upon reception of a wake-up signal from the transmission node, the reception node transmits an NLP as a response signal to the transmission node (step S30). FIG. 6 is a view illustrating an exemplary NLP to be sent as a response signal. As shown in FIG. 6, the NLP to be sent as a response signal includes a node ID for identifying the node and a wake-up ID which varies each time the node is re-started (initialized). This enables the transmission node to detect a node replacement or the presence of rebooting. Note that the transmission node performs error handling to disconnect the link when an NLP cannot be received from the reception node within a certain period of time after a frame has been sent.

Subsequently, the transmission node transmits the frame of interest to the reception node (step S40 and step S50). Here, the transmission node does not need to send an NLP if the next frame is sent within a certain period of time after the previous frame has been sent. Note that if a subsequent frame is available, then the transmission node desirably indicates in the header or trailer of a frame that the subsequent frame will follow.

Figure 7:
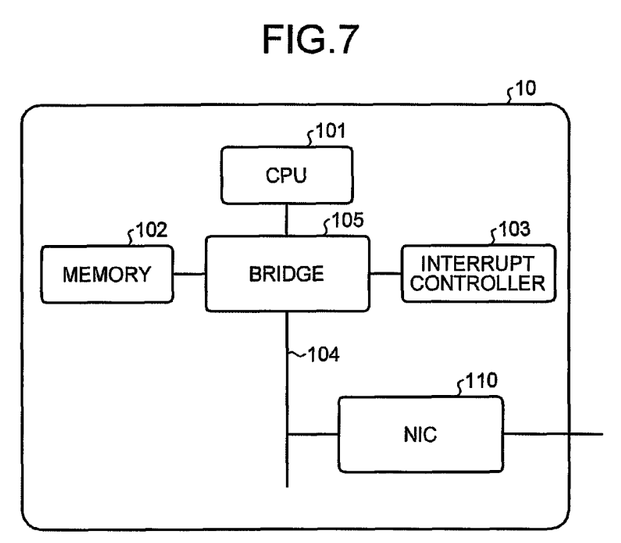
FIG. 7 is a block diagram illustrating an example of the configuration of a transmission terminal according to the first embodiment.

FIG. 7 is a block diagram illustrating an exemplary configuration of the transmission terminal 10 according to the first embodiment. As shown in FIG. 7, the transmission terminal 10 includes a CPU (Central Processing Unit) 101, a memory 102, an interrupt controller 103, a bus 104, a bridge 105, and a NIC (Network Interface Card) 110.

The transmission terminal 10 is configured such that the CPU 101 for controlling each unit of the transmission terminal 10, the memory 102 used as the work area of the CPU 101, the interrupt controller 103 for informing the CPU 101 of an interrupt request from peripheral devices such as the NIC 110, and the bus 104 are connected to each other via a bridge (chip) 105, with the NIC 110 connected to the bus 104.

The CPU 101 creates a frame to be transmitted on the memory 102 and forwards the resulting frame to the NIC 110 via the bus 104. The CPU 101 also informs the NIC 110 via the bus 104 of a frame transmission event indicative of the start of a frame transmission. Furthermore, the CPU 101 receives a link failure event from the NIC 110 via the bus 104 and the interrupt controller 103. This causes the CPU 101 to determine that the frame transmission has failed and to perform error handling. For example, as the error handling, the CPU 101 re-acquires an IP address assigned by DHCP (Dynamic Host Configuration Protocol) and if the IP address has been unsuccessfully re-acquired, then indicates an error message, for example, on a display unit (not shown).

Figure 8:
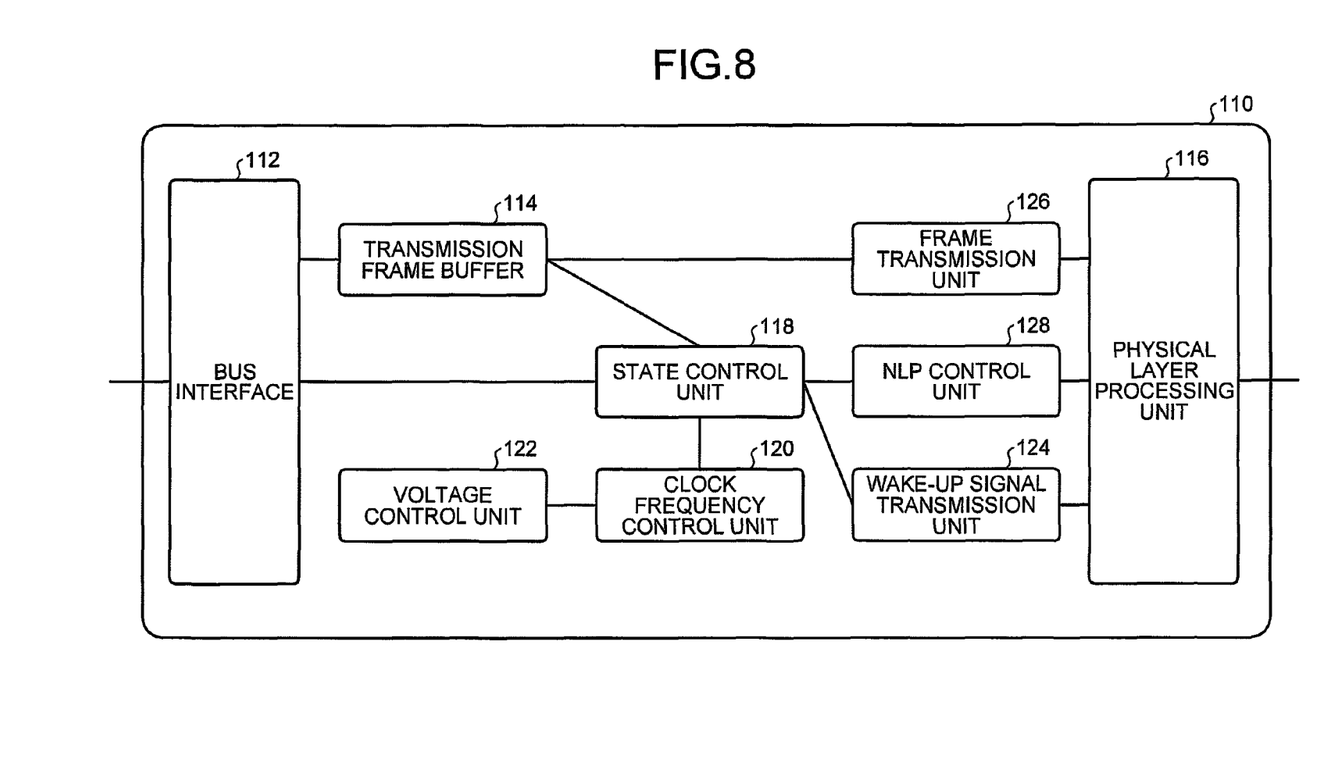
FIG. 8 is a block diagram illustrating an example of the configuration of a NIC according to the first embodiment.

FIG. 8 is a block diagram illustrating an exemplary configuration of the NIC 110 according to the first embodiment. Note that the example shown in FIG. 8 illustrates the configuration of the NIC 110 that relates only to transmission operations. As shown in FIG. 8, the NIC 110 includes a bus interface 112, a transmission frame buffer 114, a physical layer processing unit 116, a state control unit 118, a clock frequency control unit 120, a voltage control unit 122, a wake-up signal transmission unit 124, a frame transmission unit 126, and an NLP control unit 128.

The bus interface 112 serves as an interface with the bus 104. The transmission frame buffer 114 stores therein frames forwarded from the CPU 101 via the bus interface 112. The physical layer processing unit 116 performs various types of conversions at the physical layer level.

The state control unit 118 controls the NIC state indicative of the power supply state of the NIC 110. More specifically, the state control unit 118 directs the clock frequency control unit 120 to increase or decrease the clock frequency of the NIC 110 and the voltage control unit 122 to increase or decrease the supply voltage to the NIC 110.

For example, in the case where the NIC 110 is in a NIC state of N2, when informed of a frame transmission event from the CPU 101, the state control unit 118 instructs the clock frequency control unit 120 to increase the clock frequency of the NIC 110 and the voltage control unit 122 to increase the supply voltage to the NIC 110. This causes the state control unit 118 to change the NIC state of the NIC 110 from N2 to N1. Here, it is assumed that the state control unit 118 is to control the NIC state (of being N1 or N2), for example, in a memory (not shown) within the state control unit 118. Note that when the NIC 110 is in a NIC state of N1, even when informed of a frame transmission event from the CPU 101, the state control unit 118 would not provide the aforementioned instruction to the clock frequency control unit 120 and the voltage control unit 122.

When a frame is transferred to the transmission frame buffer 114, the state control unit 118 instructs the wake-up signal transmission unit 124 to transmit a wake-up signal.

Upon reception of a link failure event from the NLP control unit 128, the state control unit 118 informs the CPU 101 via the bus interface 112 about the event.

When receiving the instruction from the state control unit 118, the clock frequency control unit 120 increases or decreases the operation clock frequency of the NIC 110. Upon reception of the instruction from the state control unit 118, the voltage control unit 122 increases or decreases the supply voltage to the NIC 110.

Upon reception of the instruction from the state control unit 118, the wake-up signal transmission unit 124 sends an NLP as a wake-up signal via the physical layer processing unit 116.

The frame transmission unit 126 sequentially sends transmission frames stored in the transmission frame buffer 114 via the physical layer processing unit 116. At this time, the frame transmission unit 126 checks whether the reception node has requested to stop transmission, and if no request to stop transmission was made, sends frames.

Note that upon sending a frame to be sent, if a subsequent frame (another frame) is stored in the transmission frame buffer 114, the frame transmission unit 126 sets a subsequent frame bit (an information field indicative of the presence of a subsequent frame) into the frame to be sent and sends the resulting frame. Nevertheless, the subsequent frame bit needs not be always set.

Furthermore, the frame transmission unit 126 can transmit the frame to be transmitted without having to transmit the wake-up signal by the wake-up signal transmission unit 124 within a certain period of time after the previous frame was sent, i.e., within the period of time in which the reception node is capable of reception operations.

When having not received an NLP as a response signal within a predetermined period of time from the reception node to which the wake-up signal has been sent, the NLP control unit 128 (an example of the response signal reception unit) determines that a link disconnection has occurred and sends a link failure event to the state control unit 118. Furthermore, even when having received the NLP within a predetermined period of time, the NLP control unit 128 also sends the link failure event to the state control unit 118 when the node ID is different from the node ID of the previous NLP or when the wake-up ID is different from the wake-up ID of the previous NLP.

Note that when the NIC 110 is in a NIC state of N1, the NLP control unit 128 sends NLPs at equal intervals to the reception node and receives NLPs from the reception node, but will not perform this processing when the NIC 110 is in a NIC state of N2. This allows for further reducing power consumption when the NIC 110 is in a NIC state of N2.

Figure 9:
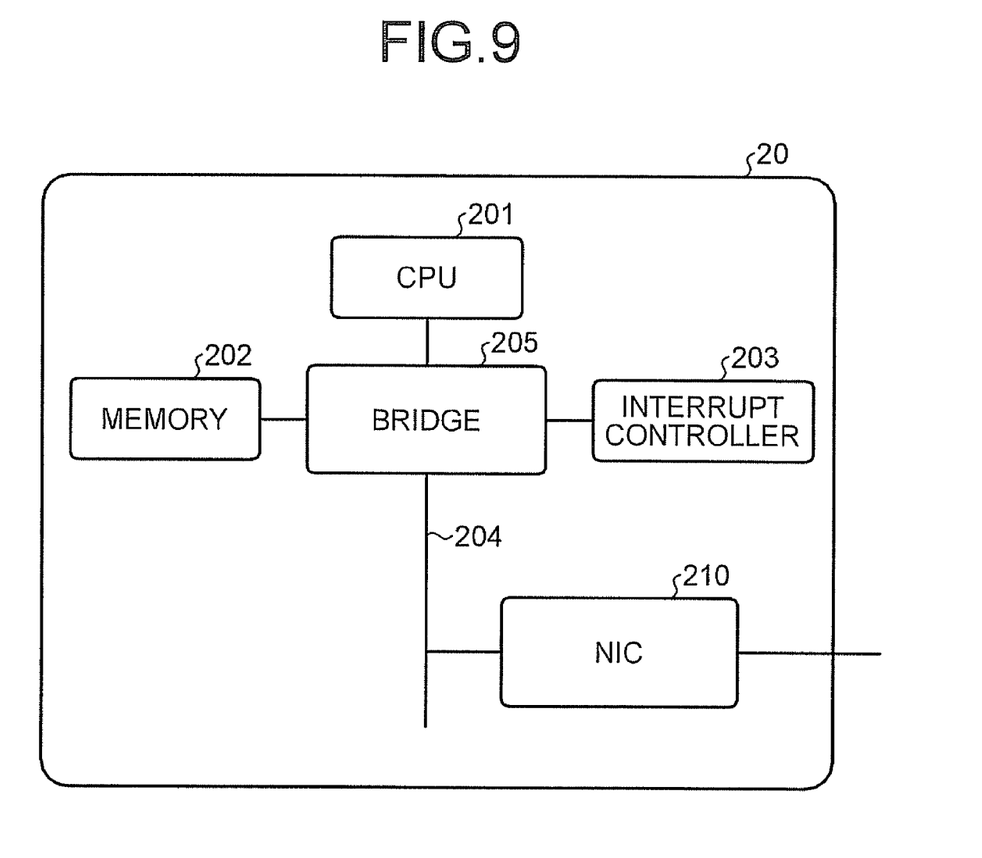
FIG. 9 is a block diagram illustrating an example of the configuration of a reception terminal according to the first embodiment.

FIG. 9 is a block diagram illustrating an exemplary configuration of the reception terminal 20 according to the first embodiment. As shown in FIG. 9, like the transmission terminal 10, the reception terminal 20 includes a CPU 201, a memory 202, an interrupt controller 203, a bus 204, a bridge 205, and a NIC 210. The reception terminal 20 is configured such that the CPU 201, the memory 202, the interrupt controller 203, and the bus 204 are connected to each other via the bridge (chip) 205, with the NIC 210 connected to the bus 204.

The CPU 201 receives, from the NIC 210 via the bus 204 and the interrupt controller 203, a state change event indicating that a NIC state of the NIC 210 has been changed from N2 to N1. At this time, the CPU 201 desirably increases the operating speed. This increase allows the CPU 201 to reduce a delay in the processing of frames received by the NIC 210. The CPU 201 also receives, from the NIC 210 via the bus 204 and the interrupt controller 203, a state change event indicating that a NIC state of the NIC 210 changes from N1 to N2.

The memory 202 receives frames forwarded from the NIC 210 via the bus 204 by means of DMA (Direct Memory Access).

Figure 10:
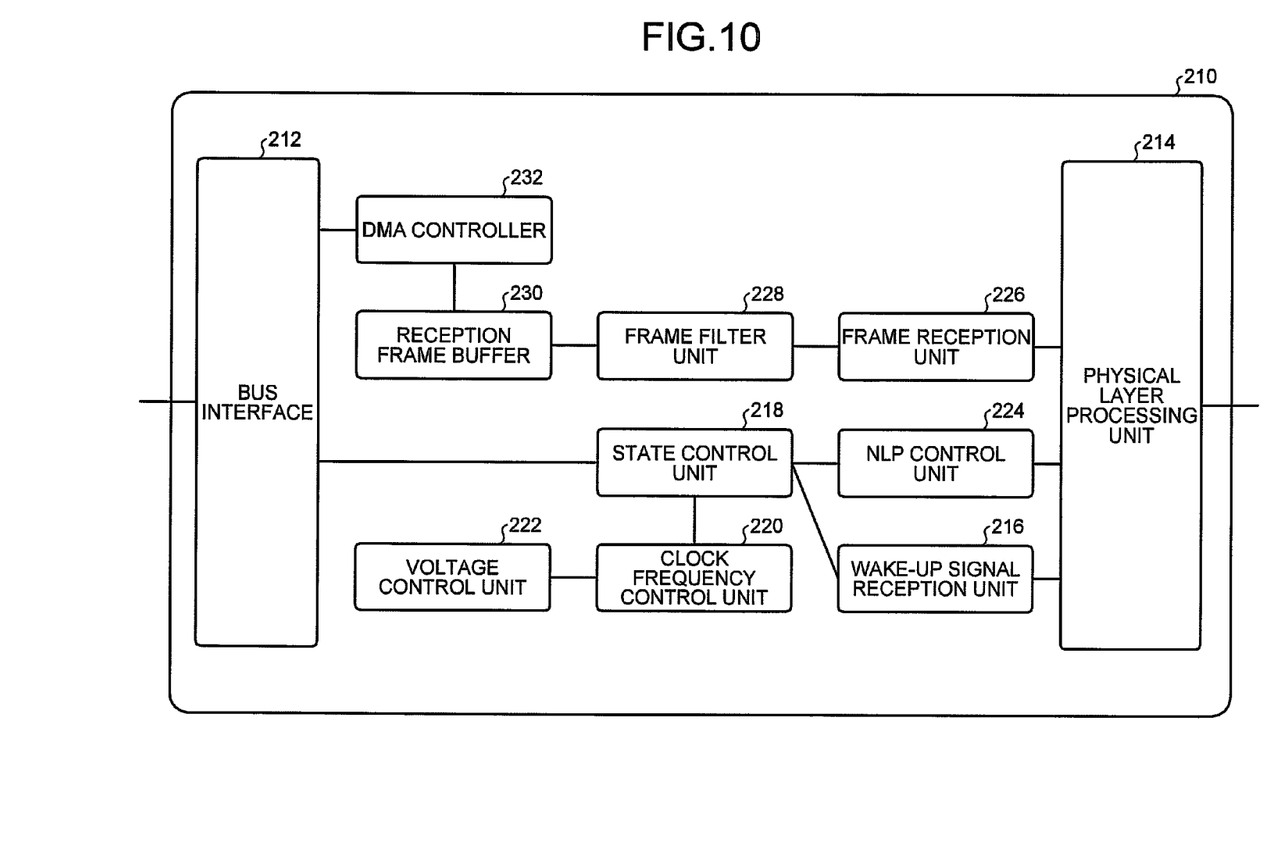
FIG. 10 is a block diagram illustrating an example of the configuration of a NIC according to the first embodiment.

FIG. 10 is a block diagram illustrating an exemplary configuration of the NIC 210 according to the first embodiment. Note that the example shown in FIG. 10 illustrates the configuration of the NIC 210 that relates only to reception operations. As shown in FIG. 10, the NIC 210 includes a bus interface 212, a physical layer processing unit 214, a wake-up signal reception unit 216, a state control unit 218, a clock frequency control unit 220, a voltage control unit 222, an NLP control unit 224, a frame reception unit 226, a frame filter unit 228, a reception frame buffer 230, and a DMA controller 232.

The bus interface 212 serves as an interface with the bus 204. The physical layer processing unit 214 performs various types of conversions at the physical layer level.

The wake-up signal reception unit 216 receives an NLP, which is transmitted from a transmission node as a wake-up signal, via the physical layer processing unit 214 and informs the state control unit 218 of the wake-up signal reception event.

The state control unit 218 controls the NIC state of the NIC 210. More specifically, the state control unit 218 directs the clock frequency control unit 220 to increase or decrease the clock frequency of the NIC 210 and the voltage control unit 222 to increase or decrease the supply voltage to the NIC 210.

For example, in the case of the NIC 210 is in a NIC state of N2, when informed by the wake-up signal reception unit 216 of the wake-up signal reception event, the state control unit 218 directs the clock frequency control unit 220 to increase the clock frequency of the NIC 210 and the voltage control unit 222 to increase the supply voltage to the NIC 210. This operation causes the state control unit 218 to change the NIC state of the NIC 210 from N2 to N1. Note that the state control unit 218 controls the NIC state (of being in N1 or N2) in a memory (not shown) within the state control unit 218. Then, the state control unit 218 directs the NLP control unit 224 to transmit an NLP. Additionally, the state control unit 218 also sends, to the CPU 201 via the bus interface 212, a state change event indicating that a NIC state of the NIC 210 has been changed from N2 to N1. Note that the state control unit 218 can also send a state change event to other than the CPU 201, for example, to a memory controller or a bus controller (both not shown).

If no frames are received by the frame reception unit 226 for a certain predetermined period of time, the state control unit 218 sends, to the CPU 201 via the bus interface 212, a state change event indicating that a NIC state of the NIC 210 changes from N1 to N2. Then, the state control unit 218 directs the clock frequency control unit 220 to decrease the clock frequency of the NIC 210 and the voltage control unit 222 to decrease the supply voltage to the NIC 210. This operation allows for reducing power consumption while the NIC 210 is receiving no frames.

Upon reception of the instruction from the state control unit 218, the clock frequency control unit 220 increases or decreases the clock frequency of the NIC 210. Upon reception of the instruction from the state control unit 218, the voltage control unit 222 increases or decreases the supply voltage to the NIC 210.

Upon reception of the instruction from the state control unit 218, the NLP control unit 224 (an example of the response signal transmission unit) sends an NLP as a response signal via the physical layer processing unit 214. Note that when the NIC 210 is in a NIC state of N2, the NLP control unit 224 transmits no NLPs at equal intervals. This operation allows for further reducing power consumption when the NIC 210 is in a NIC state of N2.

The frame reception unit 226 receives a frame via the physical layer processing unit 214, and then performs Ethernet (trade mark) MAC processing, for example, to check for a bit error in the frame using FCS (Frame Check Sequence) and check the format of the frame, and then outputs the check results. In particular, the frame reception unit 226 performs a warm-up operation using the preamble of the frame received.

The frame filter unit 228 checks the destination MAC address of the frame output from the frame reception unit 226 and discards other than the desired frame, then outputting the desired frame. As used herein, the desired frame includes, for example, a frame having a broadcast MAC address or a frame having the MAC address that the CPU has directed to receive.

The reception frame buffer 230 stores therein a frame output from the frame filter unit 228. Note that the reception frame buffer 230 can preferably store therein a plurality of frames.

The DMA controller 232 transfers the frame stored in the reception frame buffer 230 to the memory 202 by means of DMA (Direct Memory Access) via the bus interface 212. However, alternatively, the NIC 210 may also inform the CPU 201, via the bus 204 and the interrupt controller 203, of a frame reception event indicative of a start of receiving frames, and then transfers frames from the reception frame buffer 230 to the memory 202 through the CPU 201. The DMA controller 232 may also be commanded by the CPU 201 to transfer frames by means of DMA.

Figure 11:
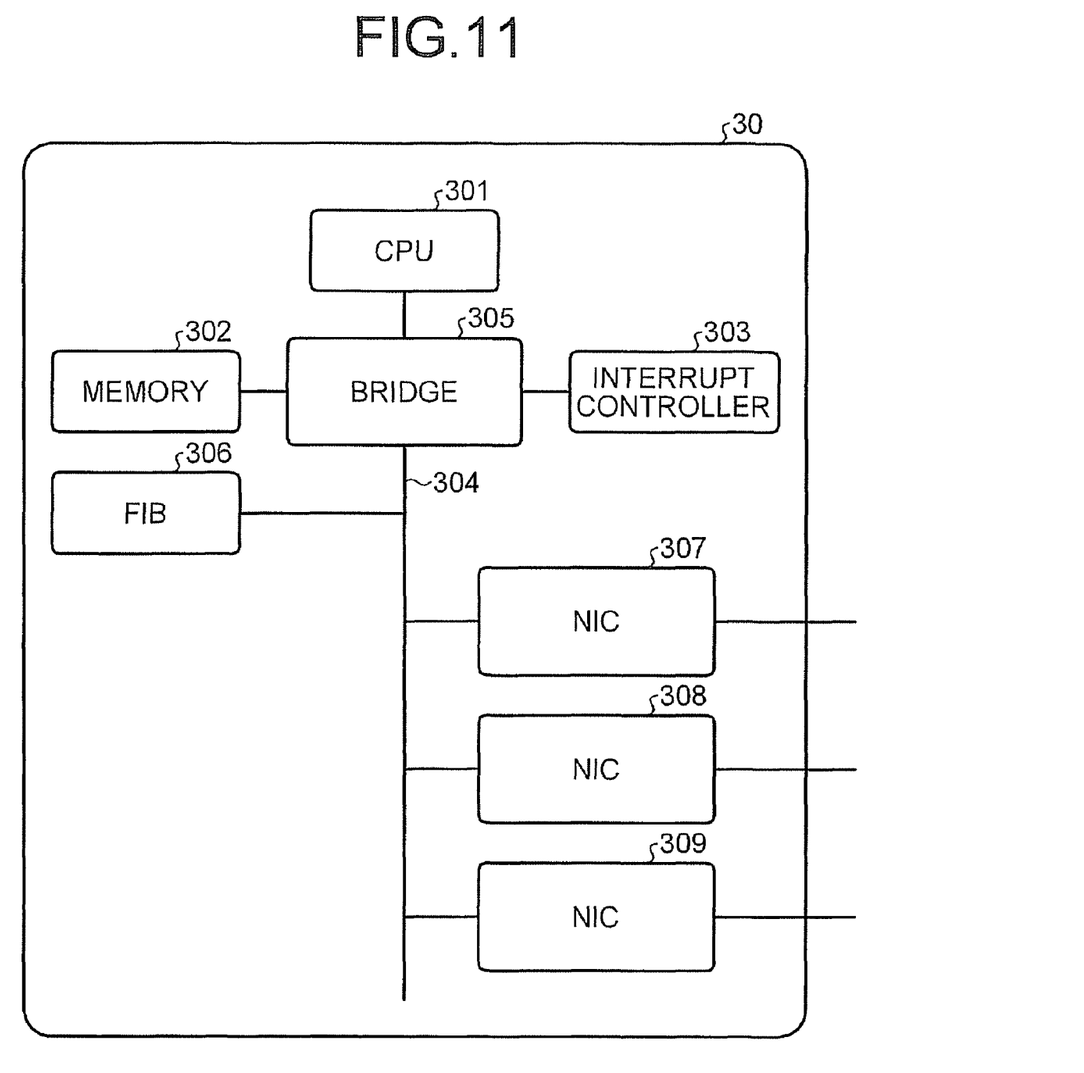
FIG. 11 is a block diagram illustrating an example of the configuration of a switch according to the first embodiment.

FIG. 11 is a block diagram illustrating an exemplary configuration of the switch 30 according to the first embodiment. As shown in FIG. 11, the switch 30 includes a CPU 301, a memory 302, an interrupt controller 303, a bus 304, a bridge 305, an FIB (Forwarding Information Base) 306, and NICs 307, 308, and 309. The switch 30 is configured such that the CPU 301, the memory 302, the interrupt controller 303, and the bus 304 are connected to each other via the bridge (chip) 305, with the FIB 306 and the NICs 307 to 309 connected to the bus 304.

The switch 30 is different from both the transmission terminal 10 and the reception terminal 20 in that it includes a plurality of NICs (three in this embodiment) and the FIB.

The FIB 306 holds MAC addresses associated with the ports (NICs), and each time a frame is received, adds the association between the transmission MAC address of the received frame and the reception port (NIC).

Upon reception of a frame, each of the NICs 307 to 309 inquires of the FIB 306 the transmission MAC address of the frame, and then sends the received frame to the resulting port. The NICs 307 to 309 are configured in the same manner as the NIC 110 shown in FIG. 8 or the NIC 210 shown in FIG. 10 except the filter unit.

The switch 30 transmits and receives frames in the same manner as the aforementioned transmission terminal 10 and the reception terminal 20 do, respectively. However, the switch 30 can drive the circuits such as the CPU 301 and the bus 304 into a sleep mode only when all the NICs 307 to 309 are in an N2 state. Since a change of the NIC state of the switch 30 from N2 to N1 takes a certain length of time, it is also possible not to permit the transition to N2 even if no frames have been received for a given period of time from the transmission terminal 10. Furthermore, even if no frames have been transmitted for a certain period of time, the NICs 307 to 309 of the switch 30 can also send a wake-up signal upon generation of a transmission frame without making a transition of the NIC state of the switch 30 to N2. This operation allows for reducing delays in the processing for transferring frames.

Figure 12:
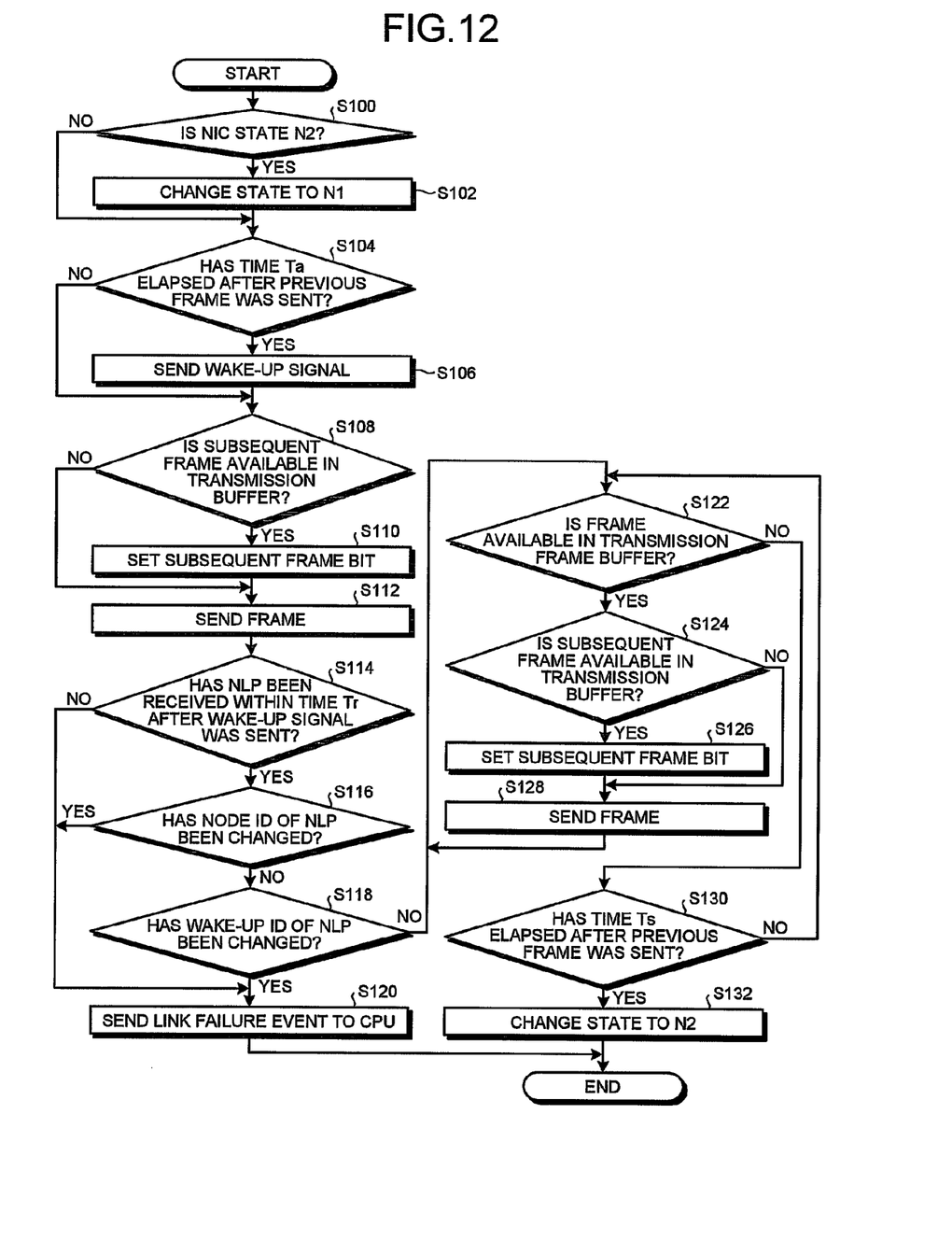
FIG. 12 is a flowchart showing, by way of example, the steps of operating a NIC according to the first embodiment.

FIG. 12 is a flowchart showing an exemplary flow of the operating steps of the NIC 110 according to the first embodiment.

First, the state control unit 118 checks whether or not the NIC state is N2, when informed by the CPU 101 of a frame transmission event (step S100).

Subsequently, when the NIC state is N2 (Yes in step S100), the state control unit 118 causes the clock frequency control unit 120 to increase the operation clock frequency and the voltage control unit 122 to increase the supply voltage to the NIC 110, thereby changing the NIC state from N2 to N1 (step S102). When the NIC state is N1 (No in step S100), the processing in step S102 is not performed.

Subsequently, the state control unit 118 checks whether time Ta has elapsed since the previous frame was transmitted (step S104). When the time Ta has elapsed (Yes in step S104), then the state control unit 118 directs the wake-up signal transmission unit 124 to transmit a wake-up signal, so that the wake-up signal transmission unit 124 sends an NLP as a wake-up signal via the physical layer processing unit 116 (step S106). When the time Ta has not yet elapsed (No in step S104), the processing in step S106 is not performed.

Subsequently, the frame transmission unit 126 acquires the frame to be transmitted from the transmission frame buffer 114, and then after having acquired the frame to be transmitted, checks whether a subsequent frame is left in the transmission frame buffer 114 (step S108). When a subsequent frame is still available (Yes in step S108), the frame transmission unit 126 sets the subsequent frame bit in the frame to be transmitted (step S110), and sends it out (step S112). In contrast, when no subsequent frame is available (No in step S108), then the frame transmission unit 126 sends the frame to be transmitted without performing the processing of step S110 (step S112).

Subsequently, the NLP control unit 128 checks whether an NLP has been received from the reception node within time Tr after the wake-up signal transmission unit 124 has sent the wake-up signal (NLP) (step S114). When the NLP was received within the time Tr (Yes in step S114), then the NLP control unit 128 checks whether there is a change in the node ID of the NLP received (step S116). Additionally, when there is no change in the node ID (No in step S116), then the NLP control unit 128 checks whether there is a change in the wake-up ID of the NLP received (step S118).

When no NLP has been received within the time Tr (No in step S114), when there is a change in the node ID (Yes in step S116), or when there is a change in the wake-up ID (Yes in step S118), then the NLP control unit 128 informs the state control unit 118 of a link failure event, so that the state control unit 118 transmits the link failure event to the CPU 101 (step S120).

In contrast, when there is no change in the wake-up ID (No in step S118), then the frame transmission unit 126 checks whether a frame is still available in the transmission frame buffer 114 (step S122).

When there is a frame remaining in the transmission frame buffer 114 (Yes in step S122), then the frame transmission unit 126 performs the processing of steps S124 to S128, and then the process returns to step S122. The processing from step S124 to step S128 is the same as the processing from step S108 to step S112, respectively, and thus will not be described again.

In contrast, when no frame is found in the transmission frame buffer 114 (No in step S122), the state control unit 118 checks whether time Ts or more has elapsed after the previous frame was transmitted (step S130). When the time Ts or more has elapsed (Yes in step S130), then the state control unit 118 causes the clock frequency control unit 120 to decrease the operation clock frequency and the voltage control unit 122 to decrease the supply voltage to the NIC 110, and changes the power supply state from N1 to N2 (step S132). Then, the process ends. When the time Ts or more has not elapsed (No in step S130), the process returns to step S122.

Figure 13:
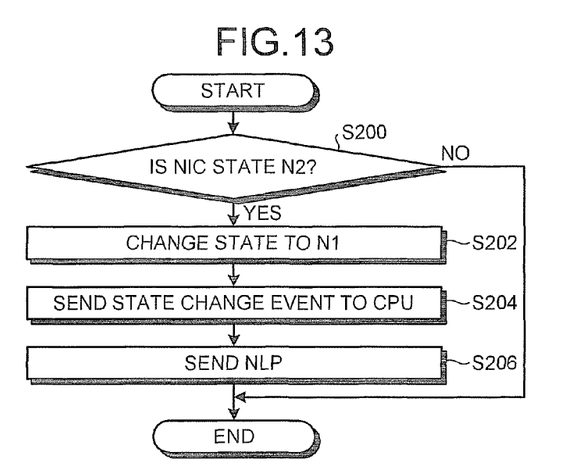
FIG. 13 is a flowchart showing, by way of example, the steps of receiving a wake-up signal using a NIC according to the first embodiment.

FIG. 13 is a flowchart showing an exemplary flow of the steps for receiving the wake-up signal by the NIC 210 according to the first embodiment.

First, when informed by the wake-up signal reception unit 216 of a wake-up signal reception event, the state control unit 218 checks whether the NIC state is N2 (step S200).

Then, when the NIC state is N2 (Yes in step S200), the state control unit 218 causes the clock frequency control unit 220 to increase the operation clock frequency and the voltage control unit 222 to increase the supply voltage to the NIC 210, thereby changing the NIC state from N2 to N1 (step S202).

Then, the state control unit 218 sends a state change event indicating that the NIC state of the NIC 210 has been changed from N2 to N1, to the CPU 201 via the bus interface 212 (step S204).

Subsequently, the state control unit 218 directs the NLP control unit 224 to transmit an NLP, so that the NLP control unit 224 sends the NLP via the physical layer processing unit 214 (step S206).

When the NIC state is N1 in step S200 (No in step S200), then the process does not perform the processing in steps S202 to S206.

Figure 14:
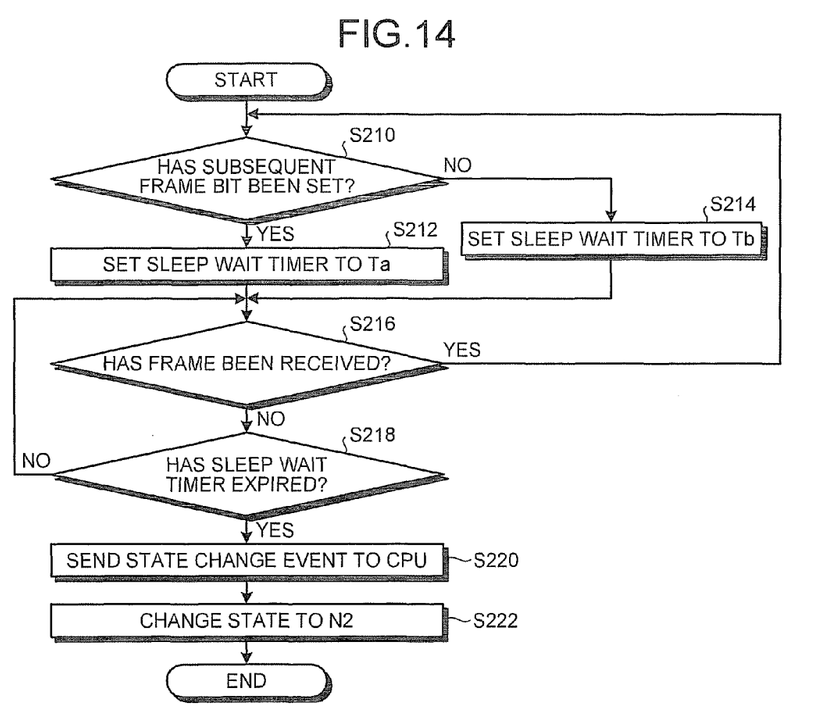
FIG. 14 is a flowchart showing, by way of example, the steps of receiving a frame using a NIC according to the first embodiment.

FIG. 14 is a flowchart showing an exemplary flow of the steps for receiving frames by the NIC 210 according to the first embodiment.

First, the frame reception unit 226 receives frames via the physical layer processing unit 214, and then checks whether a subsequent frame bit has been set in the received frame (step S210).

When a subsequent frame bit is available (Yes in step S210), then the frame reception unit 226 sets a sleep wait timer to Ta (step S212). If no subsequent frame bit is available (No in step S210), then the sleep wait timer is set to Tb (step S214). Note that Ta>Tb.

Subsequently, the frame reception unit 226 returns to step S210 when it has received a frame such as a subsequent frame (Yes in step S216), but when it has not received a frame like a subsequent frame (No in step S216), then checks whether the sleep wait timer has expired (step S218).

When the sleep wait timer has not expired (No in step S218), the frame reception unit 226 returns to step S216, while when the sleep wait timer has expired (Yes in step S218), informs the state control unit 218 of that fact. In this case, the state control unit 218 sends a state change event indicating that the NIC state of the NIC 210 changes from N1 to N2, to the CPU 201 via the bus interface 212 (step S220). Then, the state control unit 218 causes the clock frequency control unit 220 to decrease the operation clock frequency of the NIC 210 and the voltage control unit 222 to decrease the supply voltage to the NIC 210, thereby changing the NIC state from N1 to N2 (step S222).

Figure 15:
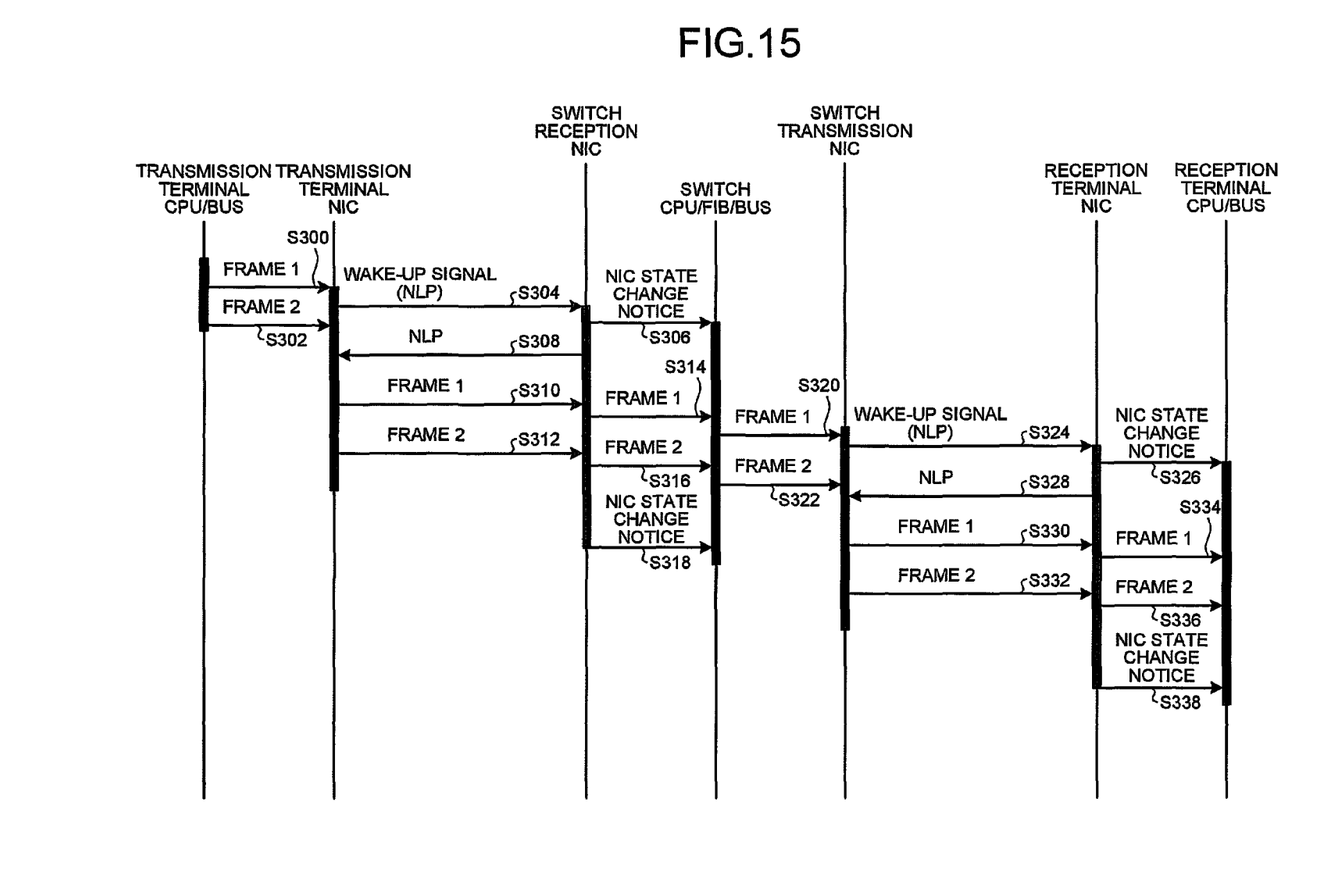
FIG. 15 is a sequence diagram illustrating, by way of example, the steps of operating an entire communication system according to the first embodiment.

FIG. 15 is a sequence diagram illustrating an exemplary flow of the operating steps of the entire communication system 1 according to the first embodiment. In the example shown in FIG. 15, the NIC state of N1 (a high-speed operation state for the CPU) is shown by bold lines, whereas the NIC of N2 (a low-speed operation state for the CPU) is shown by thin lines.

First, the CPU 101 of the transmission terminal 10 creates frames 1 and 2 to be transmitted and transmits the frames 1 and 2 to the NIC 110 (step S300 and step S302).

Subsequently, the NIC 110 of the transmission terminal 10 transmits an NLP as a wake-up signal to a reception NIC which is one of the NICs 307 to 309 of the switch 30 (step S304).

Subsequently, the reception NIC of the switch 30 informs the CPU 301 of the switch 30 of a state change event indicating that the NIC state of the reception NIC changes from N2 to N1 (step S306) and sends an NLP to the NIC 110 of the transmission terminal 10 (step S308).

Then, the NIC 110 of the transmission terminal 10 transmits the frames 1 and 2 forwarded from the CPU 101 to the reception NIC of the switch 30 (step S310 and step S312).

Next, the reception NIC of the switch 30 transfers the frames 1 and 2 transmitted from the NIC 110 of the transmission terminal 10 to the CPU 301 of the switch 30 (step S314 and step S316). If no frames are received for a predetermined period of time after that, then the reception NIC of the switch 30 sends to the CPU 301 of the switch 30 a state change event indicating that the NIC state of the reception NIC changes from N1 to N2 (step S318).

Subsequently, the CPU 301 of the switch 30 transmits the frames 1 and 2 transmitted from the reception NIC of the switch 30 to a transmission NIC which is one of the NICs 307 to 309 of the switch 30 (step S320 and step S322).

Then, the transmission NIC of the switch 30 transmits an NLP as a wake-up signal to the NIC 210 of the reception terminal 20 (step S324).

After that, the NIC 210 of the reception terminal 20 informs the CPU 201 of the reception terminal 20 of a state change event indicating that the NIC state of the NIC 210 changes from N2 to N1 (step S326) and sends an NLP to the transmission NIC of the switch 30 (step S328).

Next, the transmission NIC of the switch 30 transmits the frames 1 and 2 forwarded from the CPU 301 to the NIC 210 of the reception terminal 20 (step S330 and step S332).

Subsequently, the NIC 210 of the reception terminal 20 transfers the frames 1 and 2 transmitted from the transmission NIC of the switch 30 to the CPU 201 of the reception terminal 20 (step S334 and step S336). If no frames are received for a predetermined period of time after that, then the NIC 210 of the reception terminal 20 sends a state change event indicating that the NIC state of the NIC 210 changes from N2 to N1 to the CPU 201 of the reception terminal 20 (step S338).

As described above, according to the first embodiment, it is possible to reduce power consumption at the units responsible for communications because the NIC state of the NIC changes between the active state (N1) and the LPI state (N2) depending on whether or not there is a frame transmission/reception. In particular, since the CPU is informed of any change in the NIC state as a state change event, the CPU can provide accurate control to the power saving state.

Furthermore, according to the first embodiment, a received frame can be reliably forwarded even while the CPU is changing from a low-speed operation state to a high-speed operation state because the frame received by the NIC is forwarded by means of DMA.

According to the first embodiment, it is also possible to further reduce power consumption in a NIC state of N2 because NLPs are not transmitted or received at equal intervals when the NIC state is N2.

Furthermore, according to the first embodiment, by using the preamble of a frame which is received when the NIC state is changed from N2 to N1, a warm-up can be performed without NLPs being transmitted or received at equal intervals. Likewise, even if NLPs are not transmitted or received at equal intervals, it is possible to detect the replacement or rebooting of the reception node because the node ID and the wake-up ID are attached to the response to a wake-up signal.

Second Embodiment

In the first embodiment, a description has been made to an example in which the preamble of a frame is used for warming up the NIC (the NIC circuit) of the reception node. However, for example, at higher communication speeds such as 100 Mbps or 1 Gbps, warming up by using the preamble becomes difficult. This is because of the following reasons. That is, for example, information may be sent at high speeds by passing electrical signals through a twisted pair cable (a cable of multiple pairs of signal conductors twisted together) like the 1000Base-T cable. In this case, the signals are subjected to electromagnetic disturbances from the adjacent signal conductor pairs within the cable, thereby causing the signal waveform to be more disturbed at higher communication speeds. Furthermore, the transmitted signal through one signal conductor pair may be reflected to produce echoes, which can be superimposed on the received signal. This may also result in the waveform of the received signal being greatly distorted. Still another reason is that an extended length of preamble can cause degradation in the efficiency of transferring effective data. In this context, the second embodiment is directed to an example in which the NIC (the NIC circuit) of the reception node is warmed up using the wake-up signal. Note that in the descriptions below, the differences between the first and second embodiments will be mainly elaborated. Accordingly, the components having similar functions as those of the first embodiment will be given the same reference number and symbols as those of the first embodiment without repeatedly describing them.

It is assumed that the second embodiment employs not the NLP as the wake-up signal but an FLP (Fast Link Pulse).

Figure 16:
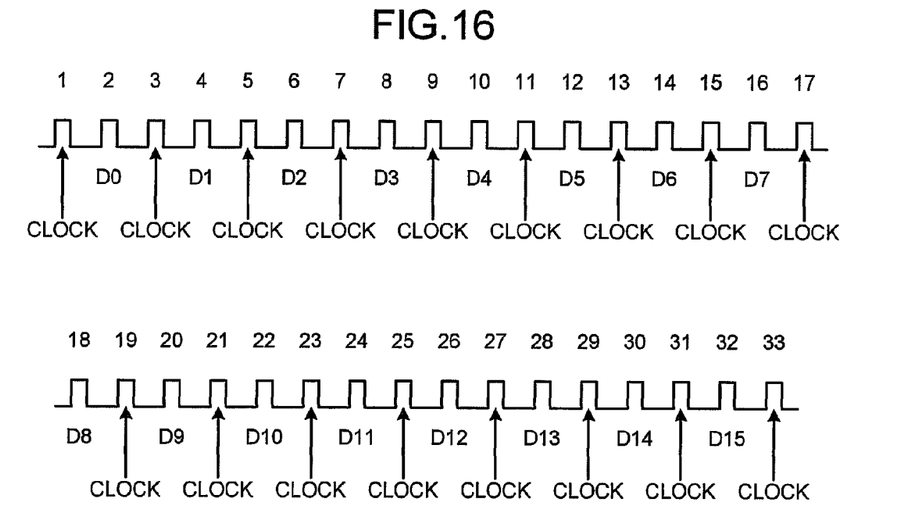
FIG. 16 is a view illustrating an example format of an FLP according to a second embodiment.
Figure 17:
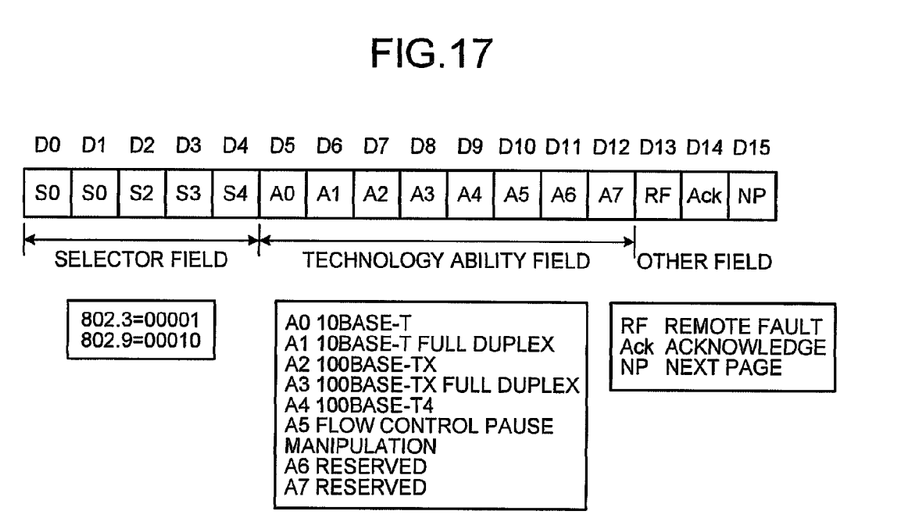
FIG. 17 is an explanatory view illustrating the information pulse of an FLP according to the second embodiment.

FIG. 16 is a view illustrating an exemplary format of the FLP, and FIG. 17 is an explanatory view of the FLP as information pulses. As shown in FIG. 16, the FLP is made up of a 33-pulse train, in which an odd-numbered pulse serves as a synchronization pulse whereas 16 even-numbered pulses act as an information pulse.

For example, as shown in FIG. 17, bits A0 to A7 define the communication scheme. The transmission node sets those bits indicative of a desired communication scheme, and then sends the resulting bits to the reception node. At this time, to warm up the communication unit of the reception node, it is desired for the transmission node to send two FLPs or more in succession.

Then, upon reception of an FLP from the reception node with "1" being set at ACK and "1" being set at the position corresponding to the desired communication scheme that has been sent, the transmission node sends frames. Note that it is preferable for an FLP received by the transmission node to be given at least either one of the node ID and the wake-up ID as in the first embodiment. This allows the transmission node to detect a replacement or rebooting of the reception node.

Figure 18:
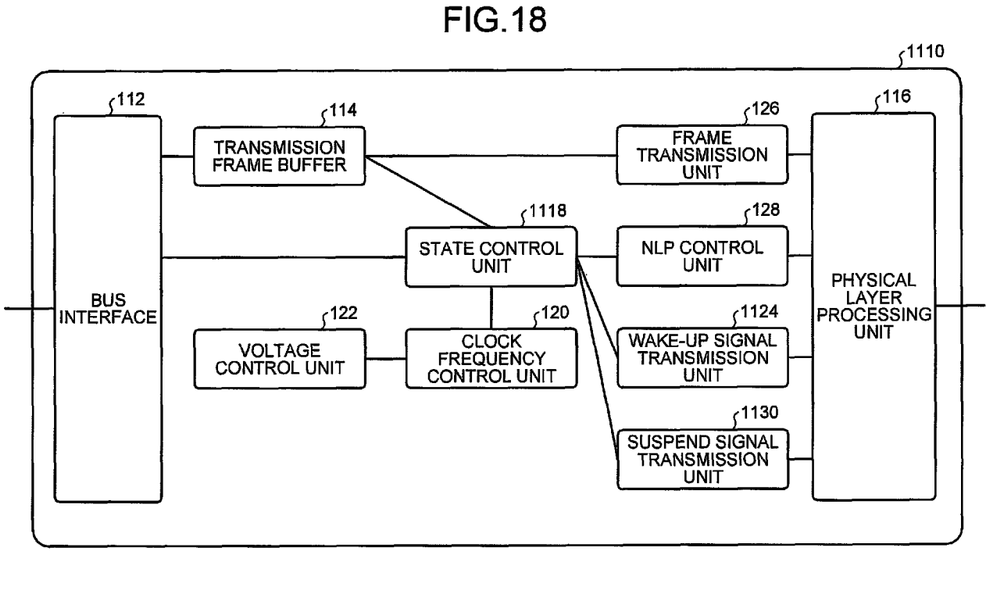
FIG. 18 is a block diagram illustrating an example of the configuration of a NIC according to the second embodiment.

FIG. 18 is a block diagram illustrating an exemplary configuration of a NIC 1110 of a transmission terminal according to the second embodiment. As shown in FIG. 18, the second embodiment is different from the first embodiment in that the NIC 1110 includes a suspend signal transmission unit 1130, and that a state control unit 1118 and a wake-up signal transmission unit 1124 perform processing differently.

The state control unit 1118 sends a state change event indicating that the NIC state of the NIC 1110 changes from N1 to N2 to the CPU 101 via the bus interface 112 when no frames are stored in the transmission frame buffer 114 for a certain period of time. Then, the state control unit 1118 directs the clock frequency control unit 120 to decrease the clock frequency of the NIC 1110 and the voltage control unit 122 to decrease the supply voltage to the NIC 1110. The state control unit 1118 also directs the suspend signal transmission unit 1130 to send a suspend signal.

Upon reception of the instruction from the state control unit 1118, the suspend signal transmission unit 1130 sends an FLP as the suspend signal via the physical layer processing unit 116. The suspend signal transmission unit 1130 may employ as the suspend signal, for example, an FLP with the bits from A0 to A5 all set at "0" or an FLP with bit A7 set at "1" (see FIG. 17). The suspend signal transmission unit 1130 may also transmit the suspend signal repeatedly twice or more. For example, it is also desirable to send the suspend signal when the transmission node is changed to a sleep state. Furthermore, for example, the transmission node serving as a client terminal may also send a transmission suspend signal when an application for sending a request to the server, for example, a browser program ends.

Upon reception of the instruction from the state control unit 1118, the wake-up signal transmission unit 1124 sends the FLP as the wake-up signal via the physical layer processing unit 116. The wake-up signal transmission unit 1124 sends such an FLP as mentioned above upon re-start of transmission. At this time, the communication scheme to be informed in the FLP may be different from the scheme that was employed before the suspension of the transmission. The wake-up signal transmission unit 1124 can also change communication speeds using the FLP during communications. It is preferable to change to the highest communication speed or the most power-efficient communication speed depending on the remaining quantity of the battery of the transmission node or the reception node. The communication speed can also be changed depending on the amount of frames to be transmitted by the transmission node. For example, it is preferable to measure the amount of transmitted frames at certain time intervals or to count the number of transmitted frames within the transmission frame buffer, and thereby change the communication speed accordingly.

Figure 19:
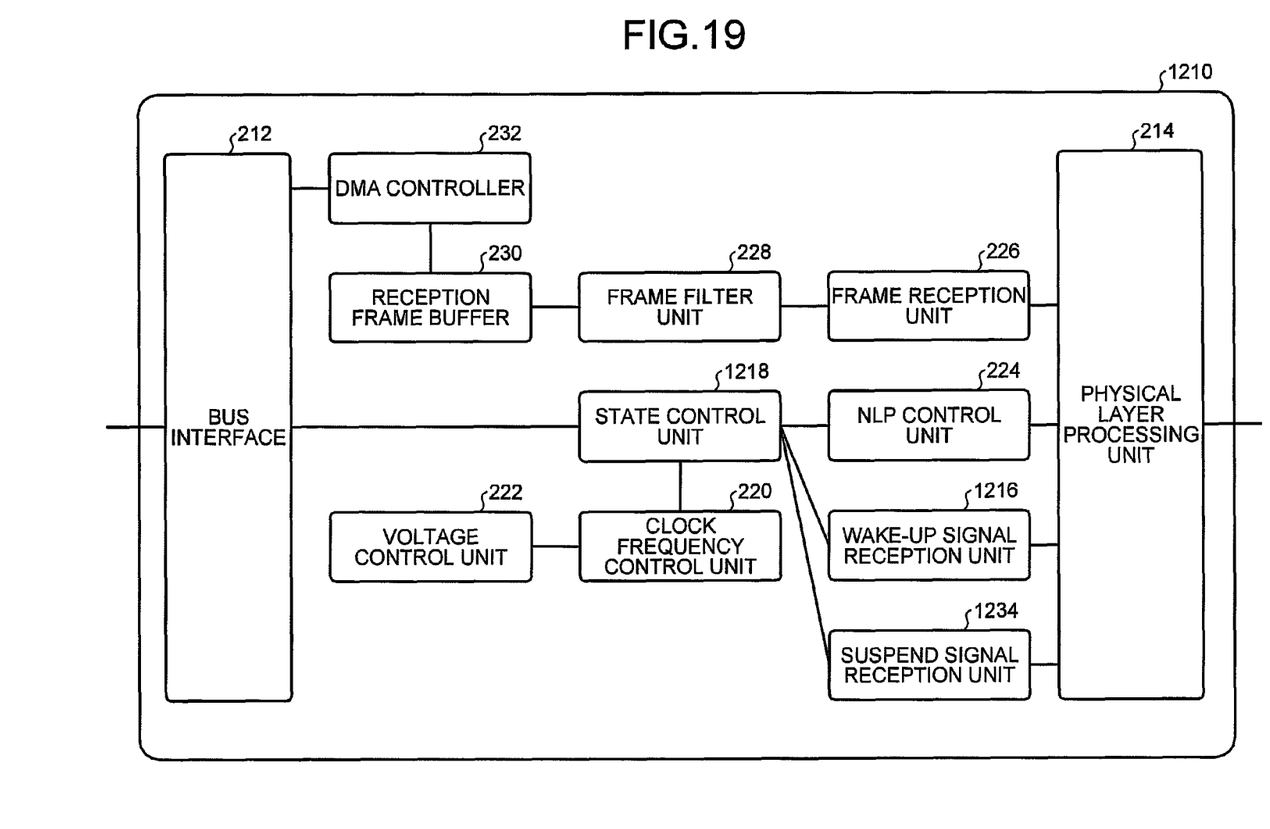
FIG. 19 is a block diagram illustrating an example of the configuration of a NIC according to the second embodiment.

FIG. 19 is a block diagram illustrating an exemplary configuration of a NIC 1210 of a reception terminal according to the second embodiment. As shown in FIG. 19, the second embodiment is different from the first embodiment in that the NIC 1210 includes a suspend signal reception unit 1234, and that a state control unit 1218 and a wake-up signal reception unit 1216 perform processing differently.

The suspend signal reception unit 1234 receives, via the physical layer processing unit 214, the FLP transmitted as a suspend signal from the transmission node, and then informs the state control unit 1218 of a suspend signal reception event.

When informed of the suspend signal reception event from the suspend signal reception unit 1234, the state control unit 1218 waits until no more frames remain in the reception frame buffer 230. When no more frames are available, the state control unit 1218 directs the clock frequency control unit 220 to increase the clock frequency of the NIC 1210 and the voltage control unit 222 to increase the supply voltage to the NIC 1210. This allows the state control unit 1218 to change the NIC state of the NIC 1210 from N1 to N2. Additionally, the state control unit 1218 sends a state change event indicating that the NIC state of the NIC 1210 has been changed from N1 to N2, to the CPU 201 via the bus interface 212.

The wake-up signal reception unit 1216 receives, via the physical layer processing unit 214, the FLP transmitted as a wake-up signal from the transmission node, and informs the state control unit 1218 of the wake-up signal reception event.

As discussions above, according to the second embodiment, even at high communication speeds, it is possible to warm up by using the wake-up signal that is received when the NIC state is changed from N2 to N1.

Modifications

In the first embodiment described above, such an example has been described in which the NLP is used as the wake-up signal; however, the embodiment is not limited thereto. It is also possible to use a signal other than the NLP as the wake-up signal.

In the aforementioned first embodiment, the Ethernet (trade mark) was taken as an example. However, the embodiment can also be applied to, other than the Ethernet (trade mark), the communication scheme which is designed to warm up the NIC using the preamble signal of a frame. For example, the embodiment is also applicable to optical communication schemes.

Furthermore, each of the aforementioned embodiments may preferably employ, as the memory or the register of the CPU, a nonvolatile memory device such as an MRAM rather than a volatile memory device such as a DRAM or an SRAM. This is because the former will not lose its stored contents even when powered off, whereas the latter will lose its stored contents when its power is cut off. This arrangement allows for cutting off the power supply to the CPU and the memory during the NIC being in the N2 state. It is thus possible to reduce power consumption which may be caused by power leakage from the read or write circuit for the CPU or MRAM.

The aforementioned embodiments may also be arranged such that the switch is connected with three or more nodes or even with another switch.

As can be seen from the above discussions on the embodiments, it is possible to reduce power consumption of units responsible for communications.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
    a wake-up signal reception unit configured to receive a wake-up signal to request a change of a state from a second state to a first state, the second state requiring less power consumption than the first state;
    a state control unit configured to initiate a change of the state from the second state to the first state and inform a control unit of the change of the state in response to reception of the wake-up signal, the control unit being configured to process a frame received during the first state; and
    a response signal transmission unit configured to transmit, in response to reception of the wake-up signal, a response signal containing communication device identification information that identifies the communication device and wake-up identification information that is varied in response to the control unit being re-started.

2. The communication device according to claim 1, wherein
    the control unit is a central processing unit, and
    the communication device further comprises a direct memory access (DMA) control unit configured to transfer the frame by means of direct memory access to a memory accessible by the central processing unit.

3. The communication device according to claim 1, wherein
    the state control unit is further configured to change the state from the second state to the first state in response to the state control unit being informed by the control unit of a frame transmission event indicative of a start of a transmission of a frame during the second state, and
    the communication device further comprises a wake-up signal transmission unit configured to transmit a wake-up signal in response to a determination that the state has changed from the second state to the first state.

4. The communication device according to claim 1, wherein the response signal is a first response signal, and the communication device further comprises a response signal reception unit configured to receive a second response signal, wherein
    in response to a determination that at least one of first communication device identification information or first wake-up identification information contained in a previously received response signal is different from at least one of second communication device identification information or second wake-up identification information contained in the second response signal received subsequent to the previously received response signal, the response signal reception unit determines that a failure has occurred.

5. The communication device according to claim 4, wherein, in response to a determination that the failure has occurred, the state control unit informs the control unit of occurrence of the failure.

6. The communication device according to claim 4, wherein the response signal reception unit is further configured to determine a parameter using a bit pattern contained in the second response signal.

7. The communication device according to claim 1, further comprising a frame reception unit configured to receive a frame and determine a parameter using a bit pattern contained in the frame.

8. The communication device according to claim 1, wherein the wake-up signal contains information regarding a communication scheme.

9. A communication system comprising:
    a transmission node and a reception node, wherein
    the transmission node comprises
        a wake-up signal transmission unit configured to transmit a wake-up signal to request a change of a state from a second state to a first state, the second state requiring less power consumption than the first state, and the reception node comprises
        a wake-up signal reception unit configured to receive the wake-up signal;
        a state control unit configured to initiate a change of the state from the second state to the first state and inform a control unit of the change of the state in response to reception of the wake-up signal, wherein the control unit is configured to process a frame received during the first state; and
        a response signal transmission unit configured to transmit, in response to reception of the wake-up signal, a response signal containing communication device identification information that identifies the communication device and wake-up identification information that varies in response to the control unit being re-started.

* * * * *